US010210323B2

United States Patent
Denier (10) Patent No.: US 10,210,323 B2
(45) Date of Patent: Feb. 19, 2019

(54) INFORMATION ASSURANCE SYSTEM FOR SECURE PROGRAM EXECUTION

(71) Applicant: The Boeing Company, Chicago, IL (US)

(72) Inventor: Robert W. Denier, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 174 days.

(21) Appl. No.: 15/148,866

(22) Filed: May 6, 2016

(65) Prior Publication Data
US 2017/0323098 A1   Nov. 9, 2017

(51) Int. Cl.
| | | |
|---|---|---|
| G06F 21/53 | (2013.01) | |
| G06F 21/64 | (2013.01) | |
| G06F 21/71 | (2013.01) | |
| G06F 21/72 | (2013.01) | |
| G06F 9/455 | (2018.01) | |

(52) U.S. Cl.
CPC .............. *G06F 21/53* (2013.01); *G06F 9/455* (2013.01); *G06F 21/64* (2013.01); *G06F 21/71* (2013.01); *G06F 21/72* (2013.01); *G06F 2221/0797* (2013.01); *G06F 2221/2107* (2013.01); *G06F 2221/2125* (2013.01); *G06F 2221/2149* (2013.01)

(58) Field of Classification Search
CPC .. G06F 9/45558; G06F 9/455; G06F 9/45533; G06F 9/45554; G06F 9/468; G06F 21/53; G06F 2212/152; G06F 2221/2149; G06F 12/1408; G06F 12/145; G06F 21/52; G06F 21/71; G06F 21/125; G06F 21/14; G06F 21/75; G06F 21/74
See application file for complete search history.

(56) References Cited

U.S. PATENT DOCUMENTS

| | | |
|---|---|---|
| 7,171,656 B2 | 1/2007 | Keim et al. |
| 7,779,449 B2 | 8/2010 | Pham |

(Continued)

FOREIGN PATENT DOCUMENTS

EP   2405376 A1   1/2012

OTHER PUBLICATIONS

John Scott Robin, et al., "Analysis of the Intel Pentium's Ability to Support a Secure Virtual Machine Monitor", Presented at Proceedings of the 9th USENIX Security Symposium, Denver, Colorado, USA, Aug. 14-17, 2000, retrieved from the Internet on Jan. 25, 2016 from http://www.cse.psu.edu/~buu1/teaching/spring06/papers/analysis-pentium.pdf, 16 pages.

(Continued)

*Primary Examiner* — Tae K Kim
(74) *Attorney, Agent, or Firm* — Kolisch Hartwell, P.C.

(57) ABSTRACT

An enhanced information assurance system may comprise an improved computer including a central processing unit (CPU) emulator configured to extend the available machine instruction set. The CPU emulator may be configured to emulate machine language instructions taken from a non-native set of secure opcodes. The CPU emulator may ensure that instructions and data in random access memory (RAM) remain encrypted at all times when in RAM, for example by storing the instructions and data in CPU registers when decrypted on an as-needed basis.

20 Claims, 4 Drawing Sheets

(56) References Cited

U.S. PATENT DOCUMENTS

| | | | |
|---|---|---|---|
| 8,966,478 B2 | 2/2015 | Hotra et al. | |
| 9,009,468 B1 | 4/2015 | Zayed | |
| 9,639,482 B2* | 5/2017 | Horovitz | G06F 12/1408 |
| 9,639,671 B2* | 5/2017 | Torrey | G06F 21/12 |
| 9,756,048 B2* | 9/2017 | Kiperberg | H04L 63/0876 |
| 9,851,978 B2* | 12/2017 | Greiner | G06F 9/3861 |
| 9,858,082 B2* | 1/2018 | Greiner | G06F 9/3861 |
| 2009/0172328 A1 | 7/2009 | Sahita et al. | |
| 2010/0042983 A1* | 2/2010 | Vick | G06F 9/45516 717/153 |
| 2010/0223447 A1* | 9/2010 | Serebrin | G06F 12/0253 712/225 |
| 2010/0281273 A1* | 11/2010 | Lee | G06F 21/72 713/190 |
| 2011/0071813 A1* | 3/2011 | Bohizic | G06F 12/1027 703/26 |
| 2011/0320773 A1* | 12/2011 | Greiner | G06F 9/30145 712/205 |
| 2012/0260064 A1* | 10/2012 | Henry | G06F 9/30076 712/41 |
| 2013/0067245 A1* | 3/2013 | Horovitz | G06F 12/1408 713/193 |
| 2014/0109091 A1* | 4/2014 | Philipson | G06F 9/4445 718/1 |
| 2014/0230077 A1* | 8/2014 | Muff | G06F 9/45533 726/30 |
| 2014/0317419 A1* | 10/2014 | Cooke | G06F 12/1408 713/193 |
| 2014/0337637 A1* | 11/2014 | Kiperberg | G06F 21/14 713/189 |
| 2015/0089173 A1* | 3/2015 | Chhabra | G06F 12/1408 711/163 |
| 2015/0089502 A1* | 3/2015 | Horovitz | G06F 9/45545 718/1 |
| 2015/0149732 A1* | 5/2015 | Kiperberg | G06F 12/1408 711/139 |
| 2015/0186170 A1* | 7/2015 | Jennings | G06F 9/45516 717/148 |
| 2015/0347724 A1* | 12/2015 | Torrey | G06F 21/12 713/190 |
| 2016/0094555 A1* | 3/2016 | Kiperberg | H04L 63/0876 713/190 |
| 2016/0110540 A1* | 4/2016 | Narendra Trivedi | G06F 21/53 726/22 |
| 2016/0147993 A1* | 5/2016 | Xu | G06F 21/53 726/22 |
| 2016/0154746 A1* | 6/2016 | Cooke | G06F 12/1408 713/193 |
| 2016/0171250 A1* | 6/2016 | Boivie | G06F 21/6209 713/189 |
| 2016/0179696 A1* | 6/2016 | Zmudzinski | G06F 12/1009 711/163 |
| 2016/0378688 A1* | 12/2016 | Rozas | G06F 12/1408 713/190 |
| 2016/0381005 A1* | 12/2016 | Vij | H04L 63/0823 726/7 |
| 2017/0026181 A1* | 1/2017 | Chhabra | G06F 9/45558 |
| 2017/0109164 A1* | 4/2017 | Grochowski | G06F 9/30036 |
| 2017/0185766 A1* | 6/2017 | Narendra Trivedi | G06F 21/53 |
| 2017/0242719 A1* | 8/2017 | Tsirkin | G06F 9/45558 |
| 2017/0288874 A1* | 10/2017 | Narendra Trivedi | H04L 9/3234 |

OTHER PUBLICATIONS

Trent Jaeger, Operating System Security: Synthesis Lectures on Information Security, Privacy and Trust #1, Chapter 11—Secure Virtual Machine Systems, 2008, retrieved from the Internet on Jan. 25, 2016 from http://www.cse.psu.edu/~trj1/cse443-s12/docs/ch11.pdf, pp. 153-167.

Intel, Introduction to Intel AES-NI and Intel Secure Key Instructions, Submitted by Gael Hofemeier (Intel) on Jul. 26, 2012, retrieved from the on Feb. 8, 2016 from https://software.intel.com/en-us/articles/introduction-to-intel-aes-ni-and-intel-secure-key-instructions, 4 pages.

Andy Greenberg, "A Crypto Trick That Makes Software Nearly Impossible to Reverse-Engineer", Wired Magazine, Feb. 11, 2015, retrieved from the Internet on Feb. 8, 2016 from http://www.wired.com/2015/02/crypto-trick-makes-software-nearly-impo, 9 pages.

Jacob Torrey, HARES FAQ, Feb. 12, 2015, retrieved from the internet on Feb. 8, 2016 from http://blog.iacobtorrey.com/hares-faq, 1 page.

Wikipedia, Disk encryption theory, last modified Feb. 4, 2016, retrieved from Internet on Feb. 8, 2016 from https://en.wikipedia.org/wiki/Disk_encryption_theory, 6 pages.

Intel, Intel Core i7-5650U Processor (4M Cache, up to 3.20 GHz) Specification, circa before Feb. 8, 2015, retrieved from at http://ark.intel.com/products/84995/Intel-Core-i7-5650U-Processor-4M-. . . 1, 4 pages.

Jacob I. Torrey, "HARES: Hardened Anti-Reverse Engineering System" Technical Whitepaper, circa before Feb. 8, 2016, retrieved from the internet at http://jacobtorrey.com/HARES-WP.pdf, 11 pages.

NXP, T2080: QorIQ T2080 and T2081 Multicore Communications Processors, circa before Feb. 8, 2016, retrieved from the internet at http://www.nxp.com/products/microcontrollers-and-processors/power-architecture-processors/qoriq-power-architecture-processors/qoriq-t2080-and-t2081-multicore-communications-processors:T2080?fpsp=1&tab=Documentation_Tab, 2 pages.

Trusted Computing Group, Trusted Platform Module—FAQs, 2016, retrieved from the Internet on Feb. 8, 2016 from http://www.trustedcomputinggroup.org/developers/trusted_platform_module/faq/, 3 pages.

European Patent Office, Examination Report regarding European Patent Application No. 17167573.9, dated Jul. 9, 2018, 5 pages.

* cited by examiner

INFORMATION ASSURANCE SYSTEM FOR SECURE PROGRAM EXECUTION

FIELD

This disclosure relates to apparatuses and methods for maintaining data and program security during code execution.

INTRODUCTION

Securing critical data and technology in modern computer programs, be they on standard desktops or critical real-time embedded systems, is a vital requirement in today's threat rich environment. This task becomes exponentially harder when the potential attacker has a large budget, direct access to the target system, and plenty of time.

Computer programs that perform critical functions (e.g., control of nuclear power plants, surgical robots, autonomous weapon systems, etc.) are generally protected through isolation from other computers and computer programs that may extract critical data or compromise their behavior and performance. In practice, the "criticality" of computer programs ranges across a broad spectrum, from cases where compromise may result in user inconvenience, to cases where the compromise may cause the temporary loss of critical infrastructure and services, to cases where a compromise may cause the loss of human life. Accordingly, there are many situations where complete isolation of the computer system is not justifiable or not practical, but where added protection of the programs and data is nevertheless highly desirable. For example, users may need to run a program that performs a critical function (justifying added security and protection) on a conventional personal computer.

The goal behind a secure design is to make the cost of obtaining the protected information greater than the value of the information protected. A specific problem is securing computer code and data while the code is in operation and the data is in use, so-called "data in use." A related problem is the securing of code and data while the power is off, so-called "data at rest," or while in transit, so-called "data in motion."

Common hardware-based approaches to these problems are based on some form of secure cryptoprocessor. A secure cryptoprocessor is a dedicated processor, embedded in tamper-resistant packaging, for carrying out cryptographic operations. The cryptoprocessor will only output decrypted data or program instructions in a secure environment. However, secure cryptoprocessors are generally for securing a relatively small amount of information, and are generally limited in the scope of the information they can protect. Scaling a secure cryptoprocessor to larger applications would be cost-prohibitive, requiring significant, dedicated resources. Furthermore, secure cryptoprocessors are fixed in silicon, thereby presenting maintenance and update challenges. Any successful attack on a system would require redevelopment and modification of a great deal of potentially expensive hardware.

A need exists for lower cost, updatable solutions that do not significantly sacrifice performance. Additionally, such solutions should be applicable to conventional computing systems, rather than requiring expensive and impractical custom hardware.

SUMMARY

The system for secure program execution according to the present teachings addresses the technical problems outlined above. Enhanced information assurance systems described herein modify the operation of a computer to include secure machine language instructions not otherwise available to the computer's processor. In some examples, this includes using an enhanced-security central processing unit (CPU) emulator. The present solutions may be based almost entirely on existing off-the-shelf processors, which may facilitate keeping up with current technologies. Systems in accordance with aspects of the present disclosure may provide protection for computer programs and associated data while in random access memory (RAM).

In some embodiments, a computer system for securely executing software instructions may include a first processor having a plurality of hardware registers; a memory; and an emulator program including a plurality of instructions stored in the memory that are executable by the first processor to: emulate a second processor, emulate execution of a plurality of native machine instructions on the second processor, the native machine instructions being native to the second processor, and emulate execution of a plurality of secure machine instructions on the second processor, the secure machine instructions being nonnative to the second processor and including one or more opcodes configured to ensure unencrypted values of operand data associated with the opcodes are stored only in one or more of the hardware registers of the first processor.

In some embodiments, a method, implemented in a computer system, may include retrieving an encrypted machine instruction from a memory; decrypting the retrieved machine instruction and storing the decrypted instruction in a first hardware register of a first processor; and emulating execution of the decrypted instruction using an emulated second processor; wherein the decrypted instruction is one of a plurality of secure instructions nonnative with respect to the emulated second processor.

In some embodiments a computer system for securely executing software instructions may include: a first processor having a plurality of hardware registers; a memory; and an emulator program including a plurality of instructions stored in the memory that are executable by the first processor to: retrieve an encrypted machine instruction from the memory; decrypt the retrieved machine instruction and store the decrypted instruction in one or more of the hardware registers of a first processor; and emulate execution of the decrypted instruction using the emulated second processor; wherein the decrypted instruction is one of a plurality of secure instructions nonnative with respect to the emulated second processor.

Features, functions, and advantages may be achieved independently in various embodiments of the present disclosure, or may be combined in yet other embodiments, further details of which can be seen with reference to the following description and drawings.

DESCRIPTION

Various aspects and examples of an information assurance (IA) system incorporating secure program execution, as well as related methods, are described below and illustrated in the associated drawings. Unless otherwise specified, an information assurance system in accordance with aspects of the present disclosure, and/or its various components, may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Information assurance systems in accordance with aspects of the present disclosure, which may be referred to herein as enhanced IA systems, provide added protection for computer programs and data running on conventional physical computers and operating systems, without isolating the computers and computer programs.

The machine instructions and registers of modern computer processors are configured to protect computer programs and data by various means, including multiple levels of security, restrictions on addressing and access to physical and paged memory, special instructions for encryption and decryption of data, and other features that prevent one program from accessing or compromising another program's code and data. However, such features do not protect against sophisticated electronic methods for accessing or modifying the contents of random access memory (RAM) and the contents of RAM pages written to hard disk.

Known virtual machine (VM) products employ the machine instructions and registers of modern computer processors to protect computer programs and data. When executing (i.e., emulating) those instructions, such VM products may invoke special procedures to implement other protections relevant to concurrent and multi-level virtual machines.

However, enhanced IA systems according to the present teachings provide protections not otherwise available with standard processors or from existing VM products. Generally speaking, enhanced IA systems effectively modify the operation of a computer, by extending the available machine language instruction set to include additional instructions configured to provide security. In some examples, this includes using an enhanced-security central processing unit (CPU) emulator. Enhanced IA systems are specifically focused on protecting computer programs and data while in RAM or stored as RAM pages written to hard disk.

Protecting Program Data

In some examples, enhanced IA systems protect program data by imposing certain restrictions. Specifically, all data stored in RAM is encrypted, all unencrypted data is stored only in physical registers, and all critical calculations are protected against processor-level interrupts that could enable other programs to inspect any unencrypted data in the registers.

This protection is facilitated by two aspects of enhanced IA systems. First, the source code of a program may be compiled or otherwise modified to include special machine instructions not found in existing computer processors or existing VM products. These machine instructions may be configured to perform various tasks, e.g.: to securely create and manage encryption keys unencrypted in physical registers and encrypted in RAM; to initialize dedicated RAM with random bits; to disable interrupts at the beginning of a secure calculation to prevent inspection of unencrypted data stored in physical processor registers; to enable interrupts at the end of a secure calculation; to encrypt data when storing unencrypted register values in RAM; to decrypt data when retrieving encrypted data from RAM and storing it in registers; etc.

Second, the resulting binary programs can be executed by an IA virtual machine (e.g., emulator) configured to execute machine language instructions of a conventional processor as well as the special machine language instructions described above. The IA virtual machine may also invoke other special procedures, in addition to those described above, when it encounters machine language instructions that control memory allocation, virtual memory paging, context switching, etc.

Protecting Program Code

It may nevertheless be possible to compromise programs making use of these special instructions, by inspection and modification of the binary representation of the program code. To provide additional protection, the binary representation of the program code may be transmitted and stored in an encrypted form and may remain in an encrypted form in RAM during execution. This is in contrast to typical practice, where computer programs may be encrypted and stored in an encrypted form, and loaded into RAM in encrypted form, but are decrypted in their entirety before execution begins.

In some examples, the binary representation of program code (i.e., machine language) may be protected by a secure sequence of steps. First, the source code of the program is prepared and compiled on a known secure, isolated computer. Second, the resulting executable binary is encrypted in a form that can be decrypted and executed by an IA virtual machine (e.g., the enhanced-security CPU emulator described below). The encrypted executable binary can then be transferred to and stored on a conventional computer. On the conventional computer, an IA virtual machine may be configured to execute the encrypted binary representation of program code while in RAM. This may be accomplished, for example, by incrementally retrieving encrypted machine language instructions and their parameters from RAM, decrypting the machine language instructions and their parameters into physical registers, and then performing the emulated operations.

Illustrative Aspects of Computer Methods, Systems, and Products

Aspects of enhanced IA systems may be embodied as a computer method, computer system, or computer program product. Accordingly, aspects of enhanced IA systems may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of enhanced IA systems may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of enhanced IA systems may be written in one or any combination of programming languages, including an object-oriented programming language such as Java, Smalltalk, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of enhanced IA systems are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the present teachings. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Overview of an Illustrative Enhanced IA System

In some examples, it may be possible to generate object code that implements secure operations in accordance with the present teachings using only CPU-native instructions executable by a standard host processor. In other examples, similar functionality may be accomplished by an enhanced IA system that extends the available instruction set using a modified processor emulator.

Figure 1:
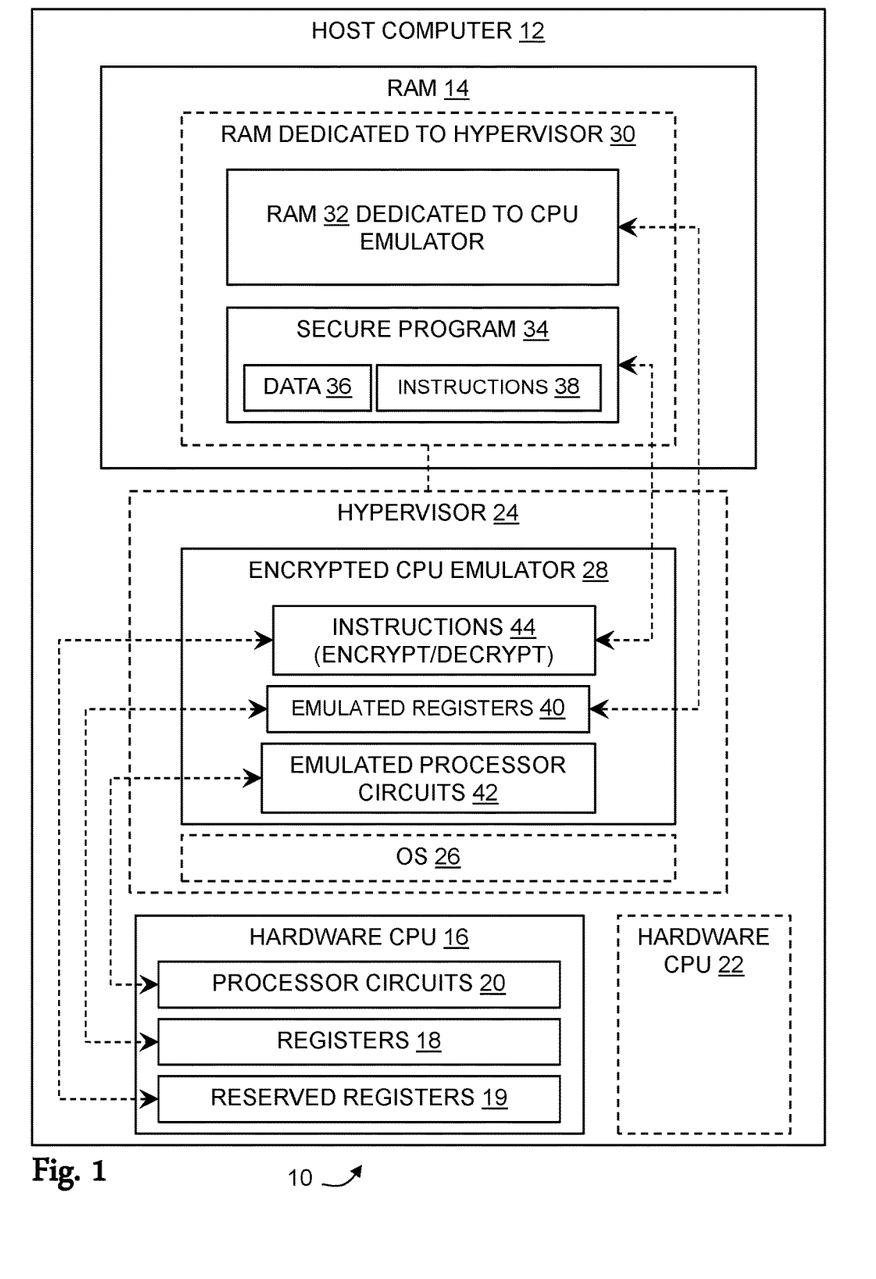
FIG. 1 is a schematic block diagram showing elements of an illustrative computer having an enhanced information assurance system in accordance with aspects of the present disclosure.

In general, such an enhanced IA system 10 may include a virtual machine running on a conventional host computer (also referred to as a digital processor and/or data processing system). Further aspects of computing systems are described in more detail below. With reference to FIG. 1, the hardware of a suitable computer 12 may include a random access memory (RAM) 14 and a physical central processing unit (CPU) 16 in communication with the RAM. CPU 16 may include any suitable processing unit or core having a plurality of registers 18 and processor circuits 20. Certain registers 19 may be reserved, e.g., for storage of encryption keys. Computer 12 may include a plurality of CPUs and/or a multi-core processor, represented here as a second CPU 22. In other words, CPU 22 may represent a second processing unit or processing core. See the section entitled Illustrative Data Processing System (below) for a discussion of additional hardware that may be included in computer 12.

System 10 may include a hypervisor 24 running on computer 12, configured to manage one or more sandboxed virtual machines. These virtual machines may include an operating system (OS) 26 and an enhanced-security CPU emulator 28. In some examples, hypervisor 24 may be a bare-metal (i.e., "native" or "type I") hypervisor. Hypervisor 24 may be in communication with a hypervisor-dedicated RAM 30, which is a portion of RAM 14 that is allocated exclusively to hypervisor 24. Similarly, an emulator-dedicated RAM 32 within hypervisor-dedicated RAM 30 may be allocated exclusively to emulator 28. In some examples, hypervisor 24 may be absent, in which case CPU emulator 28 may instead run, e.g., on a native operating system (not shown) installed on computer 12.

Emulator 28 may include any suitable CPU emulator configured to emulate the execution of a selected CPU. The selected CPU may be the same or a different type than CPU 16. Emulator 28 may be utilized to run sensitive programs, such as a secure program 34 comprising data 36 and machine language instructions 38. Secure program 34 is loadable into RAM (e.g., RAM 30).

A plurality of emulated registers 40 and emulated processor circuits 42 may be used by the emulator to emulate the selected CPU and to execute machine language instructions 38. Machine language instructions 38 (also referred to as machine instructions and/or assembly language instructions) may include opcodes, specifying operations to be performed. Operands associated with these opcodes refer to data 36 processed by the instructions. Data 36 may include unencrypted and encrypted data. Opcodes may include native (e.g., standard) opcodes normally executable by the emulated CPU, and/or secure opcodes. Emulator 28 may include a set of supplemental instructions 44 which functionally configure emulator 28 to handle such secure opcodes.

Secure opcodes in accordance with the present teachings are configured to maintain encryption of data 36 during execution of secure program 34. Secure opcodes may be taken from a set of secure computing instructions defined under the system in accordance with aspects of the present disclosure. These secure opcodes represent an expansion of the machine language instructions available to computer 12, because they are not a part of the instruction set native to CPU 16 (or, for that matter, to the standard CPU being emulated).

The secure opcodes are caused to be included in the emulated program by any suitable method. In some examples, secure opcodes are added to a program by pre-compilation directives. In some examples, secure opcodes are facilitated through modification of a native compiler. In some examples, secure opcodes are included by post-compilation modification of the object code. In some examples, the secure opcodes are included dynamically during execution, e.g., to supplement and/or replace non-secure native codes.

Emulator 28 is configured to emulate machine language instructions native to an emulated CPU in accordance with the emulated processor's specification. In other words, native opcodes are executed without modification.

Secure opcodes and secure data, however, are handled differently by the emulator. In some examples, RAM allocated to program data 36 may be obfuscated or partially obfuscated (e.g., randomized) to prevent inspection and detection of patterns in the data. In some examples, sensitive data is always encrypted when stored in RAM. In some examples, emulator 28 is configured to ensure unencrypted data is found only in hardware registers and encryption keys are found only in reserved hardware registers. In some examples, the emulator uses registers 18 of CPU 16 instead of emulated registers 40 when executing secure opcodes (e.g., within a so-called "critical section" of a program). Hardware interrupts may also be suspended when operating on sensitive data.

Illustrative Methods Using Native Opcodes

As mentioned above, the code of a software program may be modified sufficiently (e.g., through compilation and/or preprocessing) that an emulator (e.g., emulator 28) may be unnecessary. In other words, code may be modified such that it can be run securely and non-virtually by the host computer, utilizing only native opcodes recognized by the host processor. This section discusses two complementary methods for such code modification.

A first approach is to cause the program to utilize secure primitive functions that manipulate data. A second approach is to cause the program to decrypt and encrypt at the function level, thereby allowing easy control over where and when data is encrypted. The secure primitive-based method may provide higher security, while the decrypt/encrypt secure function call-based method may provide better performance. These two approaches are complementary, and the methods can be combined for additional security.

The creation of secure code based on secure primitive operations may be the more secure of the two approaches, because security is traceable back to fundamental operations. Examples of fundamental operations include addition, subtraction, multiplication, division, comparison, assignment, and type conversion. These primitives are written in assembly language (e.g., using the AES-NI operations) to ensure that information remains protected.

The general process for handling secure primitives is as follows: (1) interrupts are disabled; (2) relevant variables are decrypted, with the results stored in processor registers rather than memory; this may include checking for a valid message authentication code (MAC); (3) the underlying primitive operation is performed; (4) the result of the primitive operation is stored in another processor register; (5) the registers used in step (2) are cleared; (6) the result found in step (3) and stored in the register is encrypted and stored in main memory; (7) the processor registers used in step (6) are cleared; and (8) interrupts are re-enabled. At no point during this process would any decrypted variable reside in memory.

For instance consider the following, where X, Y and B are encrypted variables:

$$B=X+Y.$$

In this case the values of X, Y, and B are encrypted as discussed above. In this example, the addition is done by decrypting X and Y to internal processor registers, adding the two decrypted values, and then storing the result in an encrypted version of B. Externally, the only change in secure memory would be the update of the encrypted variable B where the result is stored.

Turning to the other approach, the creation of secure code based on modified function calls is complementary to the above method. Use of secure function calls may include modification of the binary code of a function, such that the function: (1) disables preemption for the call; (2) decrypts the function and runtime data to ordinary executable code and variables; (3) checks a built in MAC to verify integrity; (4) performs the function; (5) encrypts the results; and (6) erases (e.g., by overwriting with random data) the memory that was allocated, before marking it as free, including any stack used.

This second approach may be faster for many functions, particularly for functions that iterate for thousands of loops. However, the secure function call-based method does briefly leave more data and code exposed in RAM. The secure function call-based method retains considerable security, because at most there will only be as many simultaneous secure processes running as there are secure processor cores. Accordingly, even if the RAM is physically removed and inspected, the amount of possible information exposed by that snapshot is limited. At best, the data related to that one function call is exposed, without any of the surrounding context required to make sense of it.

As part of an overall defense-in-depth strategy, the security of this second approach may be further enhanced through the use of existing software obfuscation methods, which act to protect the secure function during the brief window it exists in an unencrypted state. Regular memory allocations, even if not encrypted, are still done internally by the program. The memory allocations use random locations in the larger block of memory, and the larger block of memory is filled with random numbers.

To target this kind of protection, an intruder must read the memory after the initial function decryption occurs and before the new encryption and cleanup finishes. Even that would require determination of where the actual stack is, and the stack could be placed anywhere in the secure memory. This approach has the advantage of allowing the implementer to easily choose where the encryption occurs and thus where performance may be impacted.

The encryption of the function may use a standard chaining function, such as is used for full disk encryption. In some examples, fields at the start of a function contain random numbers and a message authentication code. Once those fields are encrypted, the whole function will be protected from code book-style attacks as well as modification. When not actively being called, a secure function should remain in an encrypted state.

Illustrative Enhanced-Security CPU Emulator

As compared to the two methods outlined above, a simplified approach to provide secure program execution includes using an enhanced-security CPU emulator modified to handle secure instructions. An example of a standard CPU emulator is QEMU, available at qemu.org, which is a hypervisor configured to perform hardware virtualization, emulating CPUs through dynamic binary translation. An enhanced-security CPU emulator may be based on a hypervisor similar to QEMU (or the like).

Systems in accordance with the present teachings focus on keeping all interactions to and from main memory encrypted. It is assumed that the program or operating system to be executed already has sufficient controls on data brought into and out of the program (or operating system). The present method of encrypting all accesses to memory may be extended with other encryption operations, such that only the enhanced-security CPU emulator can decrypt the program in question and load it into its encrypted memory.

To maintain encryption of the interactions to and from main memory, the enhanced-security CPU emulator system utilizes hardware registers of a physical CPU to temporarily store unencrypted information. Accordingly, a sufficient number of such registers must be dedicated to this purpose, and not used for other purposes. This may be accomplished, for example, by emulating a CPU model that has fewer registers than the CPU physically present in the computer. This would free up all physical CPU registers that are not present in the emulated CPU for encryption and decryption operations. Said another way, implementation of the emulator is simplified if the host processor has more registers than the emulated processor. If implemented for a multi-core chip, the emulator can allocate one set of registers to the program being executed, and another set of machine registers exclusively to the enhanced-security instructions.

The enhanced-security CPU emulator will present to the operating system the appearance of contiguous memory. Actual physical memory may be fragmented, but the underlying operating system that the enhanced-security CPU emulator runs on should present the emulator with an appearance of contiguous memory. To encrypt memory, a mapping must be established. To establish a mapping it is first necessary to determine the basic form of the encryption used. For this example, 128 bits will be assumed as the encryption block size, though it need not be limited to 128 bits. Larger block sizes will tend to increase security at the expense of performance.

Once the number of bits used for encryption is determined, it is necessary to determine the number of bits used for actual data, as opposed to bits used for added entropy or any optional internal checksum. In this example, 64 bits will be assumed, though in general, the number may be any number up to the actual encryption block size. Checksums may be replaced by a cryptographic hash, as needed. In this example, when the original program accesses 0x100000 the enhanced-security CPU emulator will access a block at 0x200000, due to the message expansion factor of two. The emulator handles this transition seamlessly.

Encrypted Load and Store

As an example of secure instructions that may be implemented by the enhanced-security CPU emulator, a generic MOVE opcode will now be discussed in further detail. A generic processor instruction to load or store information could be written as:

MOVE <destination> <source>

The discussion below will focus on situations where either the source or the destination is in main memory, but not both. If both the source and destination are processor registers, then the normal unencrypted operation will occur. If the source and destination are both in main memory, then the process would include either a direct copy or a combination of an encrypted load plus an encrypted store. Note that a direct copy could only be used if an entire encrypted block were copied, and there were no provision that brought in the encrypted block offset as part of the encryption process (e.g., by making it part of the checksum calculation). Such a provision could be used to prevent a simple copy of one encrypted block to another from working.

If the source is in main memory and the destination is a processor register, the instruction will call a subroutine that will perform a sequence of native instructions that decrypt the source in main memory and store the result in a register. If the destination is in main memory and the source is a processor register, then the instruction will be replaced with one or more instructions that store the encrypted result in main memory.

Encrypted Store

Storing a value in encrypted memory is not as simple as encrypting the value and placing the result in memory. Instead, a general process may include: (1) decrypt either one or two chunks of encrypted memory and store the result in CPU register(s) (two chunks may be required if the data is not aligned with an encrypted block.); (2) optionally, verify that the decrypted memory block(s) pass any internal checksum(s) that may exist; for instance, in the discussed example, 64 bits were used for data and 64 bits were used for random bits and a checksum; this could be further divided into 32 bits of random data and a 32 bit checksum; if this checksum fails, then execute a predetermined action; (3) at this point, one or two blocks of encrypted memory should be decrypted in CPU registers; update the portion of unencrypted memory represented by those registers with the value to be stored; (4) optionally, update any areas containing random bits with new random bits; this is an expensive operation, so may not be done every time; (5) recompute the checksum(s) associated with these block(s); and (6) encrypt the resulting block(s) and store them back in the original location.

Encrypted Load

Decrypting a portion of memory to a processor register can be done as follows: (1) decrypt either one or two chunks of encrypted memory and store the result in CPU register(s) (two chunks may be required if the data is not aligned with an encrypted block.); (2) optionally, verify that the decrypted memory block(s) pass any internal checksum(s) that may exist; (3) at this point, one or two blocks of encrypted memory should be decrypted in CPU registers, and the hardware CPU register can be loaded with the relevant portion of decrypted data.

Encryption Example

This example will assume 128-bit block sizes with 64 bits of data, a 32-bit checksum, and 32 bits of random data. For example, a plain text block may be laid out as follows: [64 bits data][32 bits random][32 bits checksum]. These choices are simply for illustration. Different values may be chosen in an actual implementation to achieve different security and performance goals.

1. The CPU instruction to store 32 bits in memory location 0x100 is issued.

2. The memory the enhanced-security CPU emulator uses is divided into 128-bit (i.e., 16-byte) chunks. Each chunk contains eight bytes of actual data.

3. Because we are storing 32 bits, we know that bytes 0x100, 0x101, 0x102, and 0x103 are involved. This is what the program sees.

4. More specifically, we know that actual memory locations 0x200, 0x202, 0x204, and 0x206 are involved due to the message expansion factor.

5. From the 128-bit encryption, we know that 0x0-0xF is one block and 0x10-0x1F is another block.

6. If we divide the 0x200, 0x202, 0x204, and 0x206 by sixteen (i.e., the block size), we get the encrypted block involved in the transaction to be the 32nd block (The first block is called 0). Multiply 32 back by sixteen yields 0x200 for the location of the relevant section of encrypted memory.

7. This section of sixteen bytes of memory is loaded into a register and decrypted.

8. 0x100 in program memory maps to 0x200 in actual memory, which is the start of the 128-bit block using the aforementioned considerations. Those 32 bits can simply be stored in the 32 most significant digits of the 128-bit register.

9. Optionally, the random bit field in that register can be updated with new random bits.

10. Optionally, a checksum may be calculated that is based on everything in the 128-bit area except the checksum bits. Optionally, this checksum may also be based on the block number. In this case, it would be 32. This would make simply moving a block of memory not work.

11. The resulting 128-bit register is now encrypted, and the result is stored back in location 0x200. This means that 0x200-0x20F is updated.

In this example, if the data was instead 64 bits, it would be possible to skip the initial decryption, since none of the original data is to be reused.

In some cases, it may be advantageous to periodically, if not continually replace the random bits with new bits from the hardware random number generator, and then recompute a checksum. This may make reverse-engineering more difficult.

While not a requirement, general program design should try to keep variables aligned with memory to avoid unnecessarily splitting them among different encrypted blocks since that will cause double the number of encryption operations for every access.

Setting Keys

The enhanced-security CPU emulator will create the encryption key using a hardware number generator. This key, once stored should not be available to the program or operating system that the enhanced-security CPU emulator is running. In the general case of a fielded system, anything other than the enhanced-security CPU emulator should be prevented from accessing registers where key-related information is stored.

To encrypt or decrypt, an encryption key typically needs to be expanded into a set of subkeys. This may be done for every encryption, or the set of keys can be precomputed. Due to the sensitive nature of the keys and subkeys, the actual key should remain in a processor register. It would be preferable that the expanded subkeys should also remain in processor registers or some other secured section of memory. However, if such storage of the subkeys is impossible or impractical, then the subkeys should be cleared and recreated after every operation. Furthermore, it may be advisable that the subkeys be moved around in memory to make access difficult. The exact implementation will depend on details of the target hardware.

A microcode update may be used to dedicate a portion of the CPUs internal cache RAM for the purpose of secure subkey storage, preferably being able to store multiple sets of subkeys corresponding to multiple actual encryption keys. Such an update should also prevent that cache area from being transferred to main memory. In some examples, encryption and decryption of memory may occur only when loading data to the cache or when it is necessary to flush data from the cache back to main memory.

Illustrative Emulation Algorithm

Figure 2:
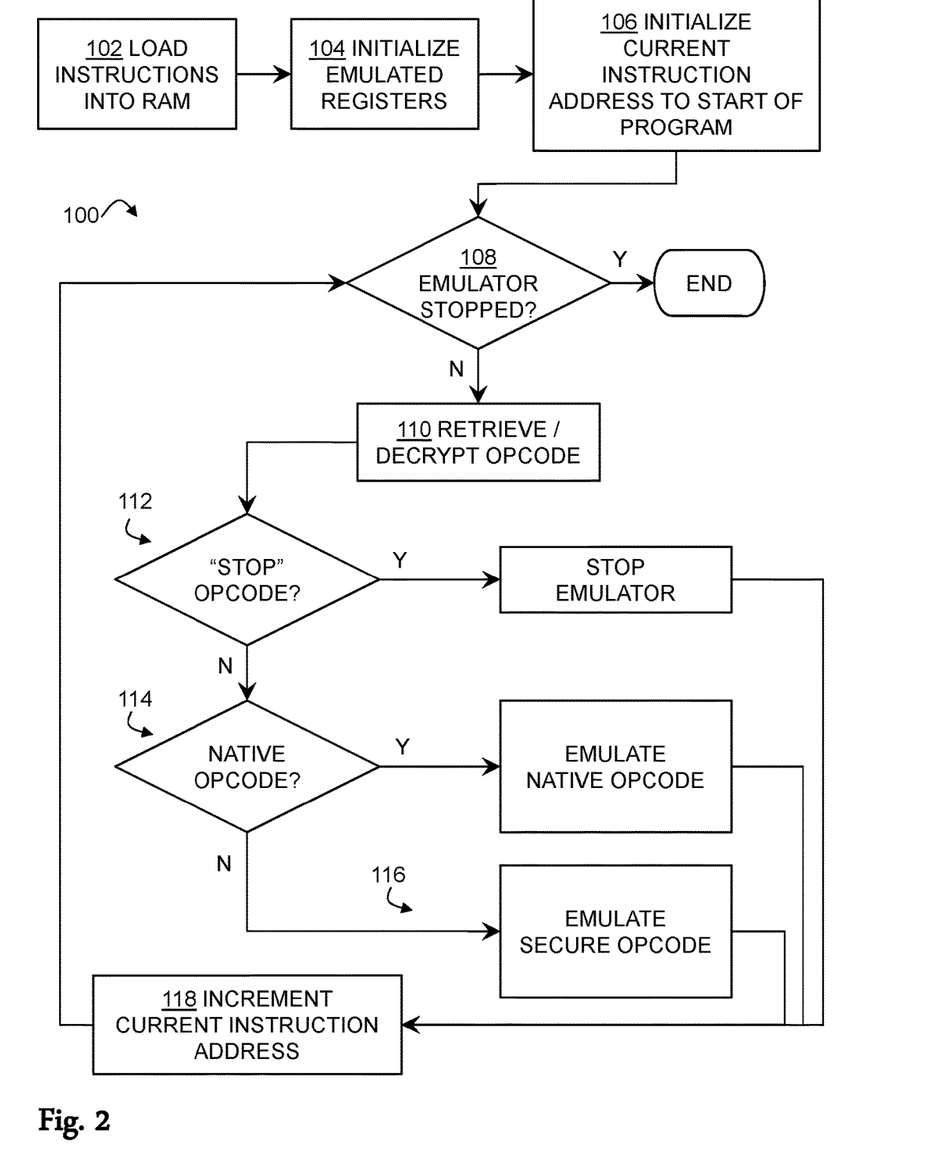
FIG. 2 is a flow chart depicting steps in an illustrative method for executing a secure program on an emulated processor in accordance with aspects of the present disclosure.

This section describes steps of an illustrative method for securely executing a sensitive software program using an enhanced IA system; see FIG. 2. Aspects of system 10 may be utilized in the method steps described below. Where appropriate, reference may be made to previously described components and systems that may be used in carrying out each step. These references are for illustration, and are not intended to limit the possible ways of carrying out any particular step of the method.

FIG. 2 is a flowchart illustrating operations performed in an illustrative method, and may not recite the complete process or all steps of the method. FIG. 2 depicts multiple steps of a method, generally indicated at 100, which may be performed in conjunction with enhanced IA systems according to aspects of the present disclosure. Although various steps of method 100 are described below and depicted in FIG. 2, the steps need not necessarily all be performed, and in some cases may be performed in a different order than the order shown.

At step 102, the emulator begins by loading the instructions of a secure program into RAM. For example, emulator 28 may load secure program 34 into RAM 30. The instructions may remain encrypted while in RAM.

At step 104, the emulator initializes emulated registers. For example, registers 40 may be zeroed.

At step 106, the emulator initializes the current instruction address to point to the start of the secure program.

At step 108, the emulator checks to see if emulation should stop and if so, ends the program emulation.

At step 110, if the emulator is not stopped, the next opcode at the current instruction pointer is retrieved. If the entire program is encrypted and secure, or if current instruction pointer is within a so-called critical section, then the retrieved instruction may be decrypted into a hardware register of the CPU. For example, the current instruction may be decrypted and the resulting decrypted instruction may be loaded into one of reserved registers 18 of CPU 16.

At step 112, if the retrieved opcode is a STOP instruction, then the emulator is instructed to stop.

At step 114, if the retrieved opcode is instead a native opcode, i.e., an opcode within the standard instruction set of the emulated CPU, then the native opcode is emulated by the emulated CPU.

At step 116, if the retrieved opcode is not a STOP instruction or a native opcode, then the instruction is a secure opcode, and the emulator will emulate the secure opcode, e.g., as if it were native to the CPU being emulated. The following section describes several examples of this emulation. In general, the emulator may include a set of supplementary emulation instructions, such as instructions 44, to be executed when emulating instructions from a known set of secure opcodes.

At step 118, the current instruction address is incremented and control is returned to step 108.

Illustrative Secure Opcode Implementations

This section describes steps of several illustrative methods for emulated execution of secure opcodes. Referring back to method 100, the methods below are examples of how an enhanced-security CPU emulator may emulate the execution of secure opcodes in step 116.

In general, this example assumes the enhanced-security CPU emulator is configured to reserve one hardware register for an encryption key, and one hardware register for a file encryption key, both keys stored in and obtained from secure non-volatile memory, as well as other registers for encryption/decryption operations and/or normal arithmetic operations. Additionally, this example implements bracketing of one or more "critical sections" using begin- and end-critical section instructions in the software code of the program being executed. This example illustrates the logic that would be implemented by a CPU emulator that implements enhanced-security instructions. These include instructions for obtaining an encryption key, for initializing memory allocated to data, for reading and writing encrypted files, for loading data from and storing data to memory allocated to encrypted data, and for disabling interrupts and later enabling them so that encryption and decryption operations can be performed securely. Loading data from and storing data to unencrypted memory are included as enhanced-security instructions (as opposed to native instructions) so that they will be performed by the emulator in the hardware CPU registers along with unencrypted data loaded from encrypted memory.

Upon reaching a next opcode, the following illustrative, pseudocode if-then statements may be executed in any order by the emulator:

```
If the opcode is <<read encryption key from secure non-volatile memory>> then {
  execute instructions to read the encryption key from secure non-volatile memory
  and save in a reserved encryption key register;
}
Else if the opcode is <<read file encryption key from secure non-volatile
memory>> then {
  execute instructions to read the file encryption key from secure non-volatile
  memory and save in a reserved file encryption key register;
}
Else if the opcode is <<begin critical section instruction>> then {
  execute instructions to suspend interrupts, save current hardware registers
  (excluding the reserved encryption key register), and zero the contents of current
  hardware registers (excluding the reserved encryption key register)
}
Else if the opcode is <<end critical section instruction>> then {
  execute instructions to zero the contents of current hardware registers (excluding
  the reserved encryption key register), restore current hardware registers (excluding the
  reserved encryption key register) and restore interrupts;
}
Else if the opcode is <<initialize memory>> then {
  execute instructions to initialize RAM allocated to emulated program data with
  random bits;
}
Else if the opcode is <<load register from encrypted memory>> then {
  retrieve register name and memory location from emulated machine language
  RAM; execute instructions to load the specified register from the specified location in
  memory allocated to the emulated program data; and decrypt using the encryption key
  found in the hardware register reserved for the encryption key;
}
Else if the opcode is <<save register to encrypted memory>> then {
  retrieve register name and memory location from emulated machine language
  RAM; execute instructions to encrypt the specified register using the encryption key
  found in the hardware register reserved for the encryption key; and save the contents of
  that register to the specified location in memory allocated to the emulated program data;
}
Else if the opcode is <<load register from unencrypted memory>> then {
  retrieve register name and memory location from emulated machine language
  RAM; execute instructions to load the specified register from the specified location in
  memory allocated to the emulated program data;
}
Else if the opcode is <<save register to unencrypted memory>> then {
  retrieve register name and memory location from emulated machine language
```

-continued

```
RAM; execute instructions to save the contents of the specified register to the specified
location in memory allocated to the emulated program data;
  }
  Else if the opcode is <<read data from encrypted file>> then {
    retrieve file name and memory location from emulated machine language RAM;
execute instructions to read the file encryption key from secure non-volatile memory and
save in a reserved file encryption key register, then incrementally read data from the
file, into a hardware register; decrypting the contents of the register using the file
encryption key found in the hardware register reserved for the file encryption key; re-
encrypting the contents of the hardware register using the encryption key found in the
hardware register reserved for the encryption key, and saving the contents of the
hardware register to the specified location in memory allocated to the emulated program
data;
  }
  Else if the opcode is <<save data to encrypted file>> then {
    retrieve file name and memory location from emulated machine language RAM;
execute instructions to read the file encryption key from secure non-volatile memory and
save in a reserved file encryption key register, then incrementally read data from the
specified location in memory allocated to the emulated program data into a hardware
register; decrypting the contents of the hardware register using the encryption key found
in the hardware register reserved for the encryption key; re-encrypting the contents of
the hardware register using the file encryption key found in the hardware register
reserved for the file encryption key, and saving the contents of the hardware register to
specified file;
  }
  Else if the opcode is not an enhanced-security opcode {
    stop emulator with an error message indicating "invalid opcode";
  }
```

Illustrative Benefits and Applications for Enhanced IA Systems

This section outlines various illustrative applications and systems that may be suitable for incorporating or working in tandem with enhanced IA systems in accordance with aspects of the present disclosure.

In a first example, enhanced IA systems may be utilized in algorithm protection. Consider a situation where a complex algorithm determines a set of coordinates for a larger program. That algorithm must be protected from being copied by an attacker from the program binary. The algorithm itself, along with associated data, could be protected by an enhanced IA system according to the present teachings, while the result of the algorithm could be sent, e.g., to the host operating system for display in a standard window.

In a second example, computer programs may be highly valuable and/or contain critical technology that must be specifically protected, e.g., before it is possible to make a sale. Accordingly, there is a need to create truly secure applications that run on everyday personal computers. A secure application could be distributed and installed with a standard windows installer. The secure parts of the program may be copied over to the secure virtual machine for execution. This protects both the actual application code and the memory used by the secure portion of the application.

In a third example, enhanced IA systems according to the present teachings may be useful in defense against malware, such as viruses and worms. The secure virtual machine will only run trusted and encrypted code. It therefore offers complete protection against viruses and worms attacking the secure portion of the code. Any part of the application that runs on the regular OS would be protected by the enhanced IA system verifying key files in the standard operating system. The secure application would verify that libraries it directly interacts with, including those provided with the application are unmodified. This protection would work even if a component of the host OS is compromised.

In a fourth example, embedded systems may incorporate enhanced IA systems according to the present teachings. Although the initial key must be delivered securely, the critical intellectual property in a flight computer system, for example, may be protected in the secure virtual machine while a program executes. Normal programs could execute in the unsecured portion of the systems. Securely obtaining the initial keys may be simpler in embedded systems, as some may already have the hardware needed for data-at-rest security. For instance, modern PowerPC-based designs come with an integrated security processor.

In a fifth example, embedded code may be recompiled to run in a desktop test environment, thus leveraging the power and availability of commercial off-the-shelf (COTS) computers for development and testing of critical software code. Such development and testing typically involves extensive modification of program code to allow it to compile and run on multiple targets. Enhanced IA systems according to the present teachings presents a solution that provides the embedded operating system side by side with the COTS operating system. This allows maintenance of the same data-in-motion security requirements as in the embedded system for essentially the same level of work. It also makes the desktop environment a more accurate representation of the real system. In some examples, a user could be allowed to change the look and feel of the user interface, but not how things work internally. Moving between desktop and embedded environments may be facilitated by keeping the same target processor architecture on both systems.

Illustrative Data Processing System

Figure 3:
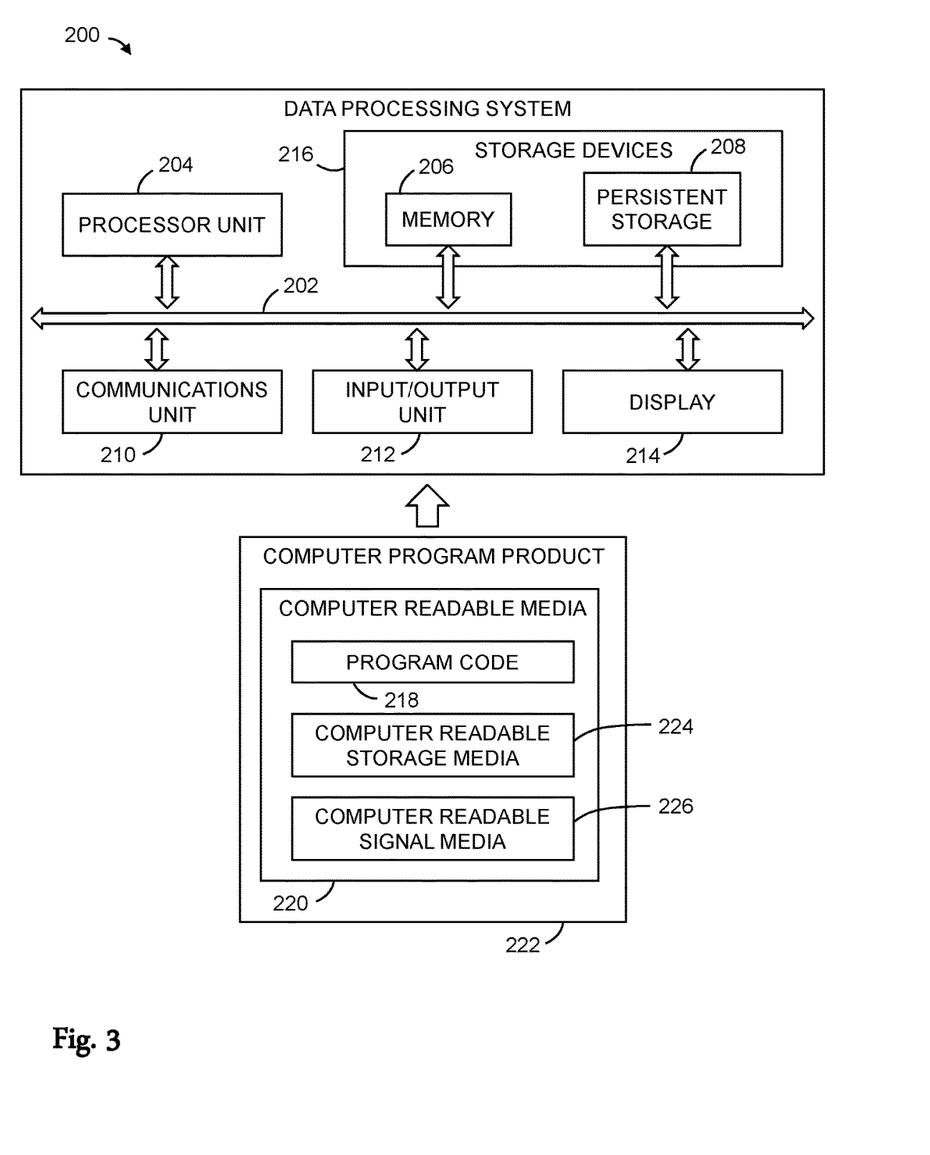
FIG. 3 is a schematic diagram of various components of an illustrative data processing system.

As shown in FIG. 3, this example describes a data processing system 200 (also referred to as a computer) in accordance with aspects of the present disclosure. In this example, data processing system 200 is an illustrative data processing system suitable for implementing aspects of enhanced IA systems according to the present teachings. More specifically, in some examples, devices that are embodiments of data processing systems (e.g., smart phones, tablets, personal computers) may include secure virtual machines configured to emulate secure opcodes, such as the systems described above.

In this illustrative example, data processing system 200 includes communications framework 202. Communications framework 202 provides communications between processor unit 204, memory 206, persistent storage 208, communications unit 210, input/output (I/O) unit 212, and display 214. Memory 206, persistent storage 208, communications unit 210, input/output (I/O) unit 212, and display 214 are examples of resources accessible by processor unit 204 via communications framework 202.

Processor unit 204 serves to run instructions that may be loaded into memory 206. Processor unit 204 may be a number of processors, a multi-processor core, or some other type of processor, depending on the particular implementation. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and other suitable information either on a temporary basis or a permanent basis.

Storage devices 216 also may be referred to as computer-readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output (I/O) unit 212 allows for input and output of data with other devices that may be connected to data processing system 200. For example, input/output (I/O) unit 212 may provide a connection for user input through a keyboard, a mouse, and/or some other suitable input device. Further, input/output (I/O) unit 212 may send output to a printer. Display 214 provides a mechanism to display information to a user.

Instructions for the operating system, applications, and/or programs may be located in storage devices 216, which are in communication with processor unit 204 through communications framework 202. In these illustrative examples, the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program instructions, program code, computer usable program code, or computer-readable program code that may be read and executed by a processor in processor unit 204. The program code in the different embodiments may be embodied on different physical or computer-readable storage media, such as memory 206 or persistent storage 208.

Program code 218 is located in a functional form on computer-readable media 220 that is selectively removable and may be loaded onto or transferred to data processing system 200 for execution by processor unit 204. Program code 218 and computer-readable media 220 form computer program product 222 in these examples. In one example, computer-readable media 220 may be computer-readable storage media 224 or computer-readable signal media 226.

Computer-readable storage media 224 may include, for example, an optical or magnetic disk that is inserted or placed into a drive or other device that is part of persistent storage 208 for transfer onto a storage device, such as a hard drive, that is part of persistent storage 208. Computer-readable storage media 224 also may take the form of a persistent storage, such as a hard drive, a thumb drive, or a flash memory, that is connected to data processing system 200. In some instances, computer-readable storage media 224 may not be removable from data processing system 200.

In these examples, computer-readable storage media 224 is a physical or tangible storage device used to store program code 218 rather than a medium that propagates or transmits program code 218. Computer-readable storage media 224 is also referred to as a computer-readable tangible storage device or a computer-readable physical storage device. In other words, computer-readable storage media 224 is a media that can be touched by a person.

Alternatively, program code 218 may be transferred to data processing system 200 using computer-readable signal media 226. Computer-readable signal media 226 may be, for example, a propagated data signal containing program code 218. For example, computer-readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer-readable signal media 226 for use within data processing system 200. For instance, program code stored in a computer-readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to and/or in place of those illustrated for data processing system 200. Other components shown in FIG. 3 can be varied from the illustrative examples shown. The different embodiments may be implemented using any hardware device or system capable of running program code. As one example, data processing system 200 may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 218 may be omitted, because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications framework 202 and may be comprised of one or more buses, such as a system bus or an input/output bus. Of course, the bus system may be implemented using any suitable type of architecture that provides for a transfer of data between different components or devices attached to the bus system.

Additionally, communications unit 210 may include a number of devices that transmit data, receive data, or both transmit and receive data. Communications unit 210 may be, for example, a modem or a network adapter, two network adapters, or some combination thereof. Further, a memory may be, for example, memory 206, or a cache, such as that found in an interface and memory controller hub that may be present in communications framework 202.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Illustrative Computer Network

Figure 4:
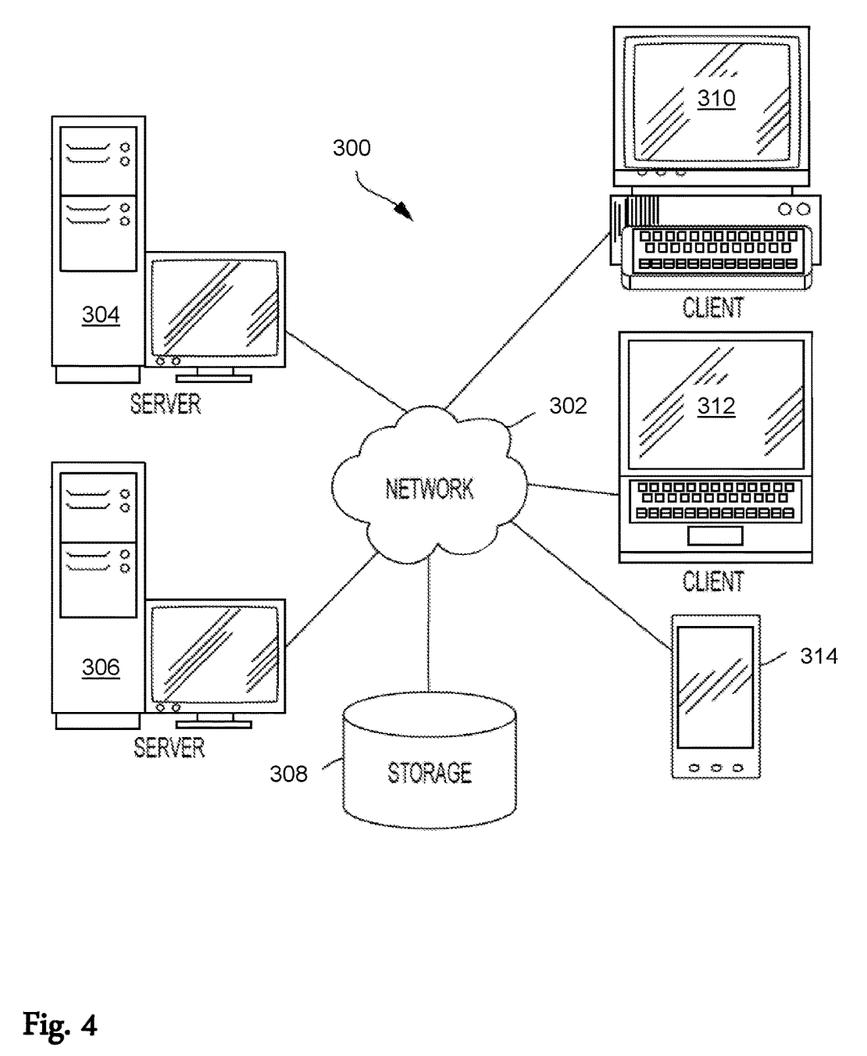
FIG. 4 is a schematic representation of an illustrative computer network system.

As shown in FIG. 4, this example describes a general network data processing system 300, interchangeably termed a network, a computer network, a network system, a distributed network, or the like, in which illustrative embodiments of enhanced IA systems and secure virtual machines may be included. For example, various aspects of the enhanced IA systems, related program instructions, encryption keys, and/or virtual machines may be implemented in or communicated using a computer network. It should be appreciated that FIG. 4 is provided as an illustration of one implementation and is not intended to imply any limitation with regard to environments in which different embodiments may be implemented. Many modifications to the depicted environment may be made.

Network data processing system 300 is a network of computers, each of which is an example of data processing system 200, and other components. Network data processing system 300 may include network 302, which is a medium configured to provide communications links between various devices and computers connected together within network data processing system 300. Network 302 may include connections such as wired or wireless communication links, fiber optic cables, and/or any other suitable medium for transmitting and/or communicating data between network devices, or any combination thereof.

In the depicted example, a first network device 304 and a second network device 306 connect to network 302, as does an electronic storage device 308. Network devices 304 and 306 are each examples of data processing system 200, described above. In the depicted example, devices 304 and 306 are shown as server computers. However, network devices may include, without limitation, one or more personal computers, mobile computing devices such as personal digital assistants (PDAs), tablets, and smart phones, handheld gaming devices, wearable devices, tablet computers, routers, switches, voice gates, servers, electronic storage devices, imaging devices, and/or other networked-enabled tools that may perform a mechanical or other function. These network devices may be interconnected through wired, wireless, optical, and other appropriate communication links.

In addition, client electronic devices, such as a client computer 310, a client laptop or tablet 312, and/or a client smartdevice 314, may connect to network 302. Each of these devices is an example of data processing system 200, described above regarding FIG. 3. Client electronic devices 310, 312, and 314 may include, for example, one or more personal computers, network computers, and/or mobile computing devices such as personal digital assistants (PDAs), smart phones, handheld gaming devices, wearable devices, and/or tablet computers, and the like. In the depicted example, server 304 provides information, such as boot files, operating system images, and applications to one or more of client electronic devices 310, 312, and 314. Client electronic devices 310, 312, and 314 may be referred to as "clients" with respect to a server such as server computer 304. Network data processing system 300 may include more or fewer servers and clients or no servers or clients, as well as other devices not shown.

Client smartdevice 314 may include any suitable portable electronic device capable of wireless communications and execution of software, such as a smartphone or a tablet. Generally speaking, the term "smartphone" may describe any suitable portable electronic device having more advanced computing ability and network connectivity than a typical mobile phone. In addition to making phone calls (e.g., over a cellular network), smartphones may be capable of sending and receiving emails, texts, and multimedia messages, accessing the Internet, and/or functioning as a web browser. Smartdevices (e.g., smartphones) may also include features of other known electronic devices, such as a media player, personal digital assistant, digital camera, video camera, and/or global positioning system. Smartdevices (e.g., smartphones) may be capable of connecting with other smartdevices, computers, or electronic devices wirelessly, such as through near field communications (NFC), BLUETOOTH®, WiFi, or mobile broadband networks.

Wireless connectively may be established among smartdevices, smartphones, computers, and other devices to form a mobile network where information can be exchanged.

Program code located in system 300 may be stored in or on a computer recordable storage medium, such as persistent storage 208, and may be downloaded to a data processing system or other device for use. For example, program code may be stored on a computer recordable storage medium on server computer 304 and downloaded for use to client 310 over network 302 for use on client 310.

Network data processing system 300 may be implemented as one or more of a number of different types of networks. For example, system 300 may include an intranet, a local area network (LAN), a wide area network (WAN), or a personal area network (PAN). In some examples, network data processing system 300 includes the Internet, with network 302 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 300 may be referred to as a "cloud." In those examples, each server 304 may be referred to as a cloud computing node, and client electronic devices may be referred to as cloud consumers, or the like. FIG. 4 is intended as an example, and not as an architectural limitation for any illustrative embodiments.

ILLUSTRATIVE EXAMPLES AND COMBINATIONS

This section describes additional aspects and features of enhanced information assurance systems, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A computer system for securely executing software instructions, the computer system comprising:
  a first processor having a plurality of hardware registers;
  a memory; and
  an emulator program including a plurality of instructions stored in the memory that are executable by the first processor to:
    emulate a second processor;
    emulate execution of a plurality of native machine instructions on the second processor, the native machine instructions being native to the second processor; and
    emulate execution of a plurality of secure machine instructions on the second processor, the secure machine instructions being nonnative to the second processor and including one or more opcodes configured to ensure unencrypted values of operand data associated with the opcodes are stored only in one or more of the hardware registers of the first processor.

A1. The computer system of A0, wherein the emulated second processor is of a different type than the first processor.

A2. The computer system of A1, wherein the emulated second processor has fewer registers than the first processor.

A3. The computer system of A0, further including a random access memory (RAM) in communication with the first processor, and a software program stored in the RAM, the software program compiled to run on the emulated second processor and containing one or more of the secure machine instructions.

A4. The computer system of A3, wherein the software program is encrypted.

A5. The computer system of A0, wherein the instructions of the emulator program are further executable by the first processor to ensure that decrypted versions of the opcodes of the secure machine instructions are stored only in one or more of the hardware registers of the first processor.

A6. The computer system of A5, wherein the instructions of the emulator program are further executable by the first processor to encrypt the operand data before storing the operand data in RAM.

B0. A method, implemented in a computer system, the method comprising:
  retrieving an encrypted machine instruction from a memory;
  decrypting the retrieved machine instruction and storing the decrypted instruction in a first hardware register of a first processor; and
  emulating execution of the decrypted instruction using an emulated second processor;
  wherein the decrypted instruction is one of a plurality of secure instructions nonnative with respect to the emulated second processor.

B1. The method of B0, wherein emulating execution of the decrypted instruction includes changing a value of an operand associated with the instruction.

B2. The method of B1, wherein changing the value of the operand includes decrypting the operand to produce a decrypted value, and storing the decrypted value in a second hardware register of the first processor.

B3. The method of B2, wherein storing the decrypted value includes storing random information in addition to the decrypted value.

B4. The method of B2, wherein changing the value of the operand further includes determining and encrypting a new value to produce one or more encrypted blocks of data, and storing the one or more encrypted blocks of data in the memory.

B5. The method of B4, wherein encrypting the new value includes encrypting a selected amount of random data with the new value.

B6. The method of B0, wherein decrypting the retrieved machine instruction includes using an encryption key stored in a third hardware register of the first processor.

C0. A computer system for securely executing software instructions, the computer system comprising:
  a first processor having a plurality of hardware registers;
  a memory; and
  an emulator program including a plurality of instructions stored in the memory that are executable by the first processor to:
    retrieve an encrypted machine instruction from the memory;
    decrypt the retrieved machine instruction and store the decrypted instruction in one or more of the hardware registers of a first processor; and
    emulate execution of the decrypted instruction using the emulated second processor;
    wherein the decrypted instruction is one of a plurality of secure instructions nonnative with respect to the emulated second processor.

C1. The computer system of C0, wherein emulating execution of the decrypted instruction includes changing a value of an operand associated with the instruction.

C2. The computer system of C1, wherein changing the value of the operand includes decrypting the operand to produce a decrypted value, and storing the decrypted value in one or more of the hardware registers of the first processor.

C3. The computer system of C2, wherein storing the decrypted value includes storing random information in addition to the decrypted value.

C4. The computer system of C2, wherein changing the value of the operand further includes determining and encrypting a new value to produce one or more encrypted blocks of data, and storing the one or more encrypted blocks of data in the memory.

C5. The computer system of C4, wherein encrypting the new value includes encrypting a selected amount of random data with the new value.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A computer system for securely executing software instructions, the computer system comprising:
    a first processor having a plurality of hardware registers;
    a memory; and
    an emulator program including a plurality of instructions stored in the memory that are executable by the first processor to:
        emulate a second processor;
        emulate execution of a software program compiled to run on the second processor and having a plurality of machine instructions native to the second processor;
        wherein execution of the software program comprises expanding the plurality of machine instructions by automatically replacing, using the emulator program, each of the machine instructions that is configured to operate on unencrypted operands with a functionally-equivalent set of secure machine instructions that are nonnative to the second processor and configured to operate only on encrypted operands; and
        wherein the secure machine instructions include one or more opcodes configured to ensure unencrypted values of operand data associated with the opcodes are stored only in one or more of the hardware registers of the first processor.

2. The computer system of claim 1, wherein the emulated second processor is both virtualized and of a different type than the first processor.

3. The computer system of claim 2, wherein the emulated second processor has fewer registers than the first processor.

4. The computer system of claim 1, further including a random access memory (RAM) in communication with the first processor, wherein the software program is stored in the RAM.

5. The computer system of claim 4, wherein the software program is encrypted.

6. The computer system of claim 1, wherein the instructions of the emulator program are further executable by the first processor to ensure that decrypted versions of the opcodes of the secure machine instructions are stored only in one or more of the hardware registers of the first processor.

7. The computer system of claim 6, wherein the instructions of the emulator program are further executable by the first processor to encrypt the operand data before storing the operand data in RAM and to decrypt the operand data after the operand data is retrieved from RAM.

8. A method, implemented in a computer system, the method comprising:
    using an emulator executed by a hardware processor to emulate execution of a software program on an emulated processor, the software program including a plurality of machine instructions native to the emulated processor;
    wherein emulating execution of the software program includes automatically replacing each of the machine instructions that is configured to operate on unencrypted operands with a functionally-equivalent set of secure machine instructions that are nonnative to the emulated processor and configured to operate only on encrypted operands;
    retrieving an encrypted one of the secure machine instructions from a memory;
    decrypting the retrieved secure machine instruction and storing the decrypted secure machine instruction in a first hardware register of the hardware processor; and
    emulating execution of the decrypted secure machine instruction using the emulated processor.

9. The method of claim 8, wherein emulating execution of the decrypted secure machine instruction includes changing a value of an operand associated with the decrypted secure machine instruction.

10. The method of claim 9, wherein changing the value of the operand includes decrypting the operand to produce a decrypted value, and storing the decrypted value in a second hardware register of the hardware processor.

11. The method of claim 10, wherein storing the decrypted value includes storing random information in addition to the decrypted value.

12. The method of claim 10, wherein changing the value of the operand further includes determining and encrypting a new value to produce one or more encrypted blocks of data, and storing the one or more encrypted blocks of data in the memory.

13. The method of claim 12, wherein encrypting the new value includes encrypting a selected amount of random data with the new value.

14. The method of claim 8, wherein decrypting the retrieved secure machine instruction includes using an encryption key stored in a third hardware register of the hardware processor.

15. A computer system for securely executing software instructions, the computer system comprising:
- a first processor having a plurality of hardware registers;
- a memory; and
- an emulator program including a plurality of instructions stored in the memory that are executable by the first processor to emulate execution of a software program on an emulated second processor, the software program including a plurality of machine instructions native to the emulated second processor;
- wherein emulating execution of the software program includes:
  - automatically replacing each of the machine instructions that is configured to operate on unencrypted operands with a functionally-equivalent set of secure machine instructions that are nonnative to the emulated second processor and configured to operate only on encrypted operands;
  - retrieving an encrypted one of the secure machine instructions from the memory;
  - decrypting the retrieved secure machine instruction and storing the decrypted secure machine instruction in one or more of the hardware registers of the first processor; and
  - emulating execution of the decrypted secure machine instruction using the emulated second processor.

16. The computer system of claim 15, wherein emulating execution of the decrypted secure machine instruction includes changing a value of an operand associated with the secure machine instruction.

17. The computer system of claim 16, wherein changing the value of the operand includes decrypting the operand to produce a decrypted value, and storing the decrypted value in one or more of the hardware registers of the first processor.

18. The computer system of claim 17, wherein storing the decrypted value includes storing random information in addition to the decrypted value.

19. The computer system of claim 17, wherein changing the value of the operand further includes determining and encrypting a new value to produce one or more encrypted blocks of data, and storing the one or more encrypted blocks of data in the memory.

20. The computer system of claim 19, wherein encrypting the new value includes encrypting a selected amount of random data with the new value.

* * * * *